US012061272B2

(12) United States Patent
Beadle et al.

(10) Patent No.: US 12,061,272 B2
(45) Date of Patent: Aug. 13, 2024

(54) SATELLITE AUTOMATIC IDENTIFICATION SYSTEM (AIS) FOR DETERMINING POTENTIAL SPOOFING MARITIME VESSELS BASED UPON ACTUAL FREQUENCY OF ARRIVAL OF AIS MESSAGES AND RELATED METHODS

(71) Applicant: Eagle Technology, LLC, Melbourne, FL (US)

(72) Inventors: Edward R. Beadle, Melbourne, FL (US); Steven R. Heuser, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 219 days.

(21) Appl. No.: 17/655,188

(22) Filed: Mar. 17, 2022

(65) Prior Publication Data

US 2023/0296719 A1   Sep. 21, 2023

(51) Int. Cl.
*G01S 19/21*   (2010.01)
*G01S 5/02*    (2010.01)
(Continued)

(52) U.S. Cl.
CPC .......... *G01S 19/215* (2013.01); *G01S 5/0246* (2020.05); *G01S 5/06* (2013.01); *G01S 19/42* (2013.01);
(Continued)

(58) Field of Classification Search
CPC ........ G01S 19/215; G01S 19/21; G01S 19/42; G01S 5/0215; G01S 5/02213;
(Continued)

(56) References Cited

U.S. PATENT DOCUMENTS 5,844,521 A   12/1998   Stephens et al.
7,663,547 B2   2/2010   Ho et al.
(Continued)

FOREIGN PATENT DOCUMENTS

CN   104270721   1/2015
CN   110210352   9/2019
(Continued)

OTHER PUBLICATIONS

Gioia et al. "Multi-Network Asynchronous TDOA Algorithm Test in a Simulated Maritime Scenario" https://www.ncbi.nlm.nih.gov/pmc/articles/PMC7180892/ pp. 22.
(Continued)

*Primary Examiner* — Chuong P Nguyen
(74) *Attorney, Agent, or Firm* — ALLEN, DYER, DOPPELT, GILCHRIST, P.A.

(57) ABSTRACT

An Automatic Identification System (AIS) for tracking a plurality of maritime vessels may include a ground AIS server and a constellation of Low-Earth Orbit (LEO) satellites in communication with the ground AIS server. Each LEO satellite may include an AIS payload configured to receive AIS messages from the plurality of maritime vessels and determine therefrom reported vessel position data, determine an actual frequency of arrival (FOA) for each of the AIS messages, determine an expected FOA for each of the AIS messages based upon the reported vessel position data for each AIS message, determine a potential spoofing maritime vessel based upon a difference between a corresponding expected FOA and actual FOA for a given AIS message, and send a potential spoof alert to the ground AIS server.

18 Claims, 10 Drawing Sheets

(51) Int. Cl.
*G01S 5/06* (2006.01)
*G01S 19/42* (2010.01)

(52) U.S. Cl.
CPC ......... *G01S 5/0215* (2013.01); *G01S 5/02213* (2020.05); *G01S 5/0249* (2020.05); *G01S 2205/04* (2020.05)

(58) Field of Classification Search
CPC ........ G01S 5/0246; G01S 5/0249; G01S 5/06; G01S 5/04; H04B 7/19; G08G 3/00
USPC .............................. 342/357.59, 357.25, 451
See application file for complete search history.

(56) References Cited

U.S. PATENT DOCUMENTS

| | | | |
|---|---|---|---|
| 7,809,370 B2* | 10/2010 | Stolte | H04B 7/18513 455/427 |
| 8,004,459 B2 | 8/2011 | Ho et al. | |
| 8,411,969 B1 | 4/2013 | Joslin et al. | |
| 9,007,262 B1 | 4/2015 | Witzgall | |
| 9,015,567 B2 | 4/2015 | Peach | |
| 9,779,594 B2 | 10/2017 | Rigdon et al. | |
| 9,842,504 B2* | 12/2017 | Short | G01S 5/0027 |
| 10,290,053 B2 | 5/2019 | Priess et al. | |
| 10,746,880 B2* | 8/2020 | Ben-Moshe | G01S 19/21 |
| 10,862,907 B1 | 12/2020 | Pon et al. | |
| 10,872,136 B2 | 12/2020 | Franco | |
| 10,872,322 B2 | 12/2020 | Siddique et al. | |
| 10,884,138 B2* | 1/2021 | Ernandes | G01S 5/0294 |
| 10,884,803 B2 | 1/2021 | Shear et al. | |
| 10,885,173 B2 | 1/2021 | Witchey et al. | |
| 10,887,330 B2 | 1/2021 | Christian | |
| 10,891,621 B2 | 1/2021 | Oka et al. | |
| 10,896,421 B2 | 1/2021 | Adjaoute | |
| 10,902,105 B2 | 1/2021 | Strong et al. | |
| 10,943,436 B2 | 3/2021 | Malek | |
| 10,963,910 B2 | 3/2021 | Golan et al. | |
| 10,965,707 B2 | 3/2021 | Kraning et al. | |
| 10,984,633 B2 | 4/2021 | Malek | |
| 10,986,124 B2 | 4/2021 | Thomas et al. | |
| 11,023,894 B2 | 6/2021 | Adjaoute | |
| 11,044,267 B2 | 6/2021 | Jakobsson et al. | |
| 11,048,788 B2 | 6/2021 | Witchey et al. | |
| 11,062,317 B2 | 7/2021 | Adjaoute | |
| 11,070,575 B2 | 7/2021 | Ravindranath et al. | |
| 11,080,336 B2 | 8/2021 | Van Dusen | |
| 11,080,407 B2 | 8/2021 | Mahaffey | |
| 11,080,668 B2 | 8/2021 | Ceribelli et al. | |
| 11,089,038 B2 | 8/2021 | Muttik | |
| 11,095,588 B2 | 8/2021 | Santos | |
| 11,100,933 B2 | 8/2021 | Lefkofsky et al. | |
| 11,102,238 B2 | 8/2021 | Ackerman et al. | |
| 11,102,244 B1 | 8/2021 | Jakobsson et al. | |
| 2008/0252525 A1 | 10/2008 | Ho et al. | |
| 2008/0304597 A1* | 12/2008 | Peach | G08G 3/02 375/324 |
| 2009/0161797 A1 | 6/2009 | Cowles et al. | |
| 2014/0258802 A1 | 9/2014 | Randhawa et al. | |
| 2015/0071492 A1 | 3/2015 | Barr et al. | |
| 2016/0054425 A1 | 2/2016 | Katz | |
| 2016/0349373 A1* | 12/2016 | Ben-Moshe | G01S 19/21 |
| 2017/0043848 A1 | 2/2017 | Rigdon et al. | |
| 2017/0102466 A1* | 4/2017 | Petkus | G01S 5/0249 |
| 2018/0123680 A1* | 5/2018 | Stolte | H04B 7/18513 |
| 2019/0219705 A1 | 7/2019 | Akos et al. | |
| 2020/0278433 A1 | 9/2020 | Vanhakartano et al. | |
| 2020/0371246 A1* | 11/2020 | Marmet | G01S 5/0009 |
| 2020/0410301 A1 | 12/2020 | Delay et al. | |
| 2021/0116558 A1 | 4/2021 | Chan et al. | |
| 2022/0397682 A1* | 12/2022 | Saunders | G01S 19/215 |
| 2023/0161050 A1 | 5/2023 | Salzman et al. | |

FOREIGN PATENT DOCUMENTS

| | | |
|---|---|---|
| CN | 111179638 | 5/2020 |
| EP | 2610636 | 7/2013 |
| GB | 2580857 | 8/2020 |
| WO | WO2015127540 | 9/2015 |

OTHER PUBLICATIONS

Gregersen et al. "Detecting AIS position spoofing using LEO satellites, Doppler shifts, and MCMC method" Aalborg University Mathematical Engineering 2018; pp. 198.

Ball, Heather "Satellite AIS For Dummies®, Special Edition" 2013 by John Wiley & Sons Canada, Ltd. pp. 67.

Witzgall et al. "Doppler Geolocation with Drifting Carrier" The 2011 Military Communications Conference—Track 1—Waveforms and Signal Processing; pp. 3.

Chen et al. "Analysis on the Performance Bound of Doppler Positioning Using One LEO Satellite".

Nelson et al. "Target location from the estimated instantaneous received frequency" Proceedings of SPIE—The International Society for Optical Engineering 8020; May 2011; pp. 9.

Levanon et al. "Angle-Independent Doppler Velocity Measurement" IEEE Transactions on Aerospace and Electronic Systems 19(3) Jun. 1983; :354-359.

Mason, John J. "Sandia Report—TOA / FOA Geolocation Error Analysis" SAND2008-5682 Aug. 2008; pp. 21.

Witzgall et al. "Single Platform Passive Doppler Geolocation with Unknown Emitter Frequency" IEEEAC paper#1316, Version 4, Updated 2009:12:28 pp. 8.

Small, Andrew J. "Radio Frequency Emitter Geolocation Using Cubesats" Radio Frequency Emitter Geolocation Using Cubesats (2014).Theses and Dissertations. 624. https://scholar.afit.edu/etd/624; pp. 102.

Levanon, Nadav "Quick Position Determination Using 1 or 2 LEO Satellites" IEEE Transactions On Aerospace and Electronic Systems vol. 34, No. Jul. 3, 1998 pp. 19.

Ellis, Patrick Buenviaje "Geolocation of a Radio Frequency Emitter using a Single Low Earth Satellite" UC Santa Cruz Electronic Theses and Dissertations' 2020; pp. 140.

Pillai et al. "Space based radar: theory & appliaations" McGrawwhill: 2008; Abstract Only.

Kay, Steven "Fundamentals of statistical signal processing, vol. 1: estimation theory" Pearson, 1993; Abstract Only.

Gou et al. "Space Electronic Reconnaissance: Localization Theories and Methods" Wiley Teleconf: 2014 Abstract Only.

Johnson et al. "Cramer-Rao Lower Bounds for Estimation of Doppler Frequency in Emitter Location Systems" IEEE Transactions on Aerospace and Electronic Systems; pp. 24.

U.S. Appl. No. 17/655,191, filed Mar. 17, 2022 Beadle et al.

U.S. Appl. No. 17/655,195, filed Mar. 17, 2022 Beadle et al.

Zhang et al., "Detection of AIS closing behavior and MMSI spoofing behavior of shops based on spatiotemporal data", Remote Sensing, Feb. 2020, 19 pgs.

Ellis et al., "Single Satellite Emitter Geolocation in the Presence of Oscillator and Ephemeris Errors", IEEE, 2020, 7 pgs.

* cited by examiner

SATELLITE AUTOMATIC IDENTIFICATION SYSTEM (AIS) FOR DETERMINING POTENTIAL SPOOFING MARITIME VESSELS BASED UPON ACTUAL FREQUENCY OF ARRIVAL OF AIS MESSAGES AND RELATED METHODS

TECHNICAL FIELD

The present invention relates to the field of identification systems, and, more particularly, to a satellite-based Automatic Identification System (AIS) for tracking a plurality of maritime vessels and related methods.

BACKGROUND

While AIS was originally employed to provide collision avoidance for maritime vessels, its application has been extended into maritime surveillance using terrestrial and space-borne receivers. The AIS system, however, is a self-monitored reporting system and misreporting occurs from equipment failures or deliberately by "bad actors." These "bad actors" may use a number of techniques to "spoof" the reported AIS data to avoid detection from authorities, which may endanger other marine vessels by not correctly reporting their position. Further, localized global positioning system (GPS) jamming could result in significant misreporting because AIS normally uses a vessel's GPS to report its position, and thus, reporting incorrect GPS coordinates by the AIS endangers all maritime vessels in a jammed area.

In addition, there are any number of vessels that may be inadvertently or deliberately misreporting. For example, vessels may be "Zero MMSI", meaning that they do not have a registered device. Alternatively, vessels may report the same Maritime Mobile Service Identity (MMSI) as other vessels, which may occur when the MMSI is "pirated" or possibly obtained from used equipment. This is often a result of MMSI assignment to a device being permanent or difficult to change as required by the FCC. Also, some vessels may lack GPS information reporting capability because of a broken GPS, GPS interface, or the GPS was disconnected, for example. Some vessels may configure their AIS to "flip" the sign of latitude and/or longitude data when reporting to avoid detection. There may be (or soon may be) more refined methods to manipulate the AIS reporting data such as offsetting or walking location reporting, for example.

Various approaches have been developed for validating AIS reporting data. One such approach is set forth in U.S. Patent Application No. 2018/0123680 to Stolte et al. As the AIS data is received, the data is tagged with a measured frequency offset from a nominal frequency and a time delay to determine actual signal propagation delay. An expected frequency and time offset based upon a position report and latest satellite ephemeris are then calculated to determine an expected signal propagation delay. If a comparison of the measured signal parameters (e.g., propagation delay) to the expected signal parameters (e.g., propagation delay) exceeds a threshold, then the AIS data is flagged as suspect.

Despite the advantages provided by such systems, further improvements may be desirable for more efficient and accurate validation of AIS data.

SUMMARY

An Automatic Identification System (AIS) for tracking a plurality of maritime vessels may include a ground AIS server and a constellation of Low-Earth Orbit (LEO) satellites in communication with the ground AIS server. Each LEO satellite may include an AIS payload configured to receive AIS messages from the plurality of maritime vessels and determine therefrom reported vessel position data, determine an actual frequency of arrival (FOA) for each of the AIS messages, determine an expected FOA for each of the AIS messages based upon the reported vessel position data for each AIS message, determine a potential spoofing maritime vessel based upon a difference between a corresponding expected FOA and actual FOA for a given AIS message, and send a potential spoof alert to the ground AIS server.

In an example embodiment, each AIS payload may be further configured to determine an actual time of arrival (TOA) for each of the received AIS messages, determine an expected TOA for each of the AIS messages based upon the reported vessel position data for the AIS message, and determine the potential spoofing maritime vessel further based upon a difference between a corresponding expected TOA and actual TOA for the given AIS message. In accordance with another example implementation, each AIS payload may be further configured to send a plurality of AIS messages and associated expected FOAs and actual FOAs to the ground AIS server for the potential spoofing maritime vessel. Furthermore, the ground AIS server may be configured to determine an estimated position of the potential spoofing maritime vessel based upon the plurality of AIS messages and associated expected FOAs and actual FOAs.

In accordance with another example, the ground AIS server may be configured to determine the estimated position of the potential spoofing maritime vessel based upon a nonlinear least squares algorithm. In still another example implementation, the ground AIS server may be configured to determine the estimated position of the potential spoofing maritime vessel further based upon satellite ephemeris data. The maritime vessels may have different vessel categories associated therewith, and in some embodiments each AIS payload may determine the potential spoofing maritime vessel based upon the different vessel categories.

A related AIS payload for a LEO satellite may include a receiver, a transmitter, and a processor configured to cooperate with the receiver and transmitter to receive AIS messages from the plurality of maritime vessels via the receiver and determine therefrom reported vessel position data, determine an actual FOA for each of the AIS messages, and determine an expected FOA for each of the AIS messages based upon the reported vessel position data for each AIS message. The processor may further determine a potential spoofing maritime vessel based upon a difference between a corresponding expected FOA and actual FOA for a given AIS message and send a potential spoof alert to the ground AIS server via the transmitter.

A related ground AIS server may include a processor and associated memory configured to receive AIS messages from the plurality of maritime vessels via a constellation of LEO satellites (the AIS messages including reported vessel position data), receive potential spoof alerts from the LEO satellites for potential spoofing maritime vessels along with expected FOA and actual FOA data for AIS messages. The processor may further determine estimated positions of the potential spoofing maritime vessels based upon the AIS messages and associated expected FOAs and actual FOAs.

A related method for tracking a plurality of maritime vessels using a satellite AIS, such as the one described briefly above, may include, at each AIS payload, receiving AIS messages from the plurality of maritime vessels and determining therefrom reported vessel position data, determining an actual FOA for each of the AIS messages, determining an expected FOA for each of the AIS messages based upon the reported vessel position data for each AIS message, and determining a potential spoofing maritime vessel based upon a difference between a corresponding expected FOA and actual FOA for a given AIS message and sending a potential spoof alert to the ground AIS server. The method may further include receiving the potential spoof alert at the ground AIS server.

DETAILED DESCRIPTION OF THE PREFERRED EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime and multiple prime notation are used to indicate similar elements in different embodiments.

Figure 1:
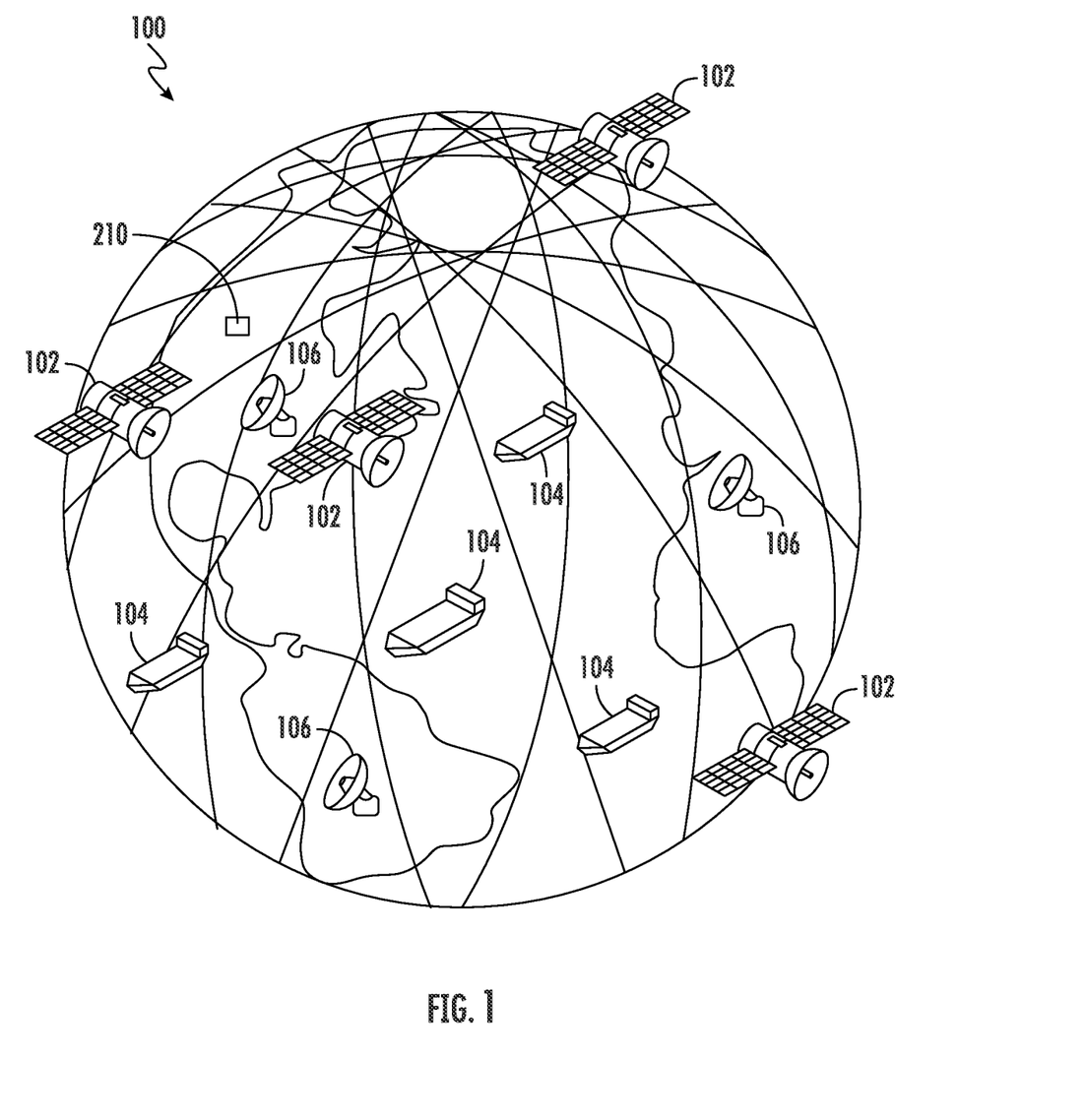
FIG. 1 is a schematic diagram of an exemplary satellite Automatic Identification System (AIS) for tracking a plurality of maritime vessels and performing spoof detection in accordance with an example embodiment.
Figure 2:
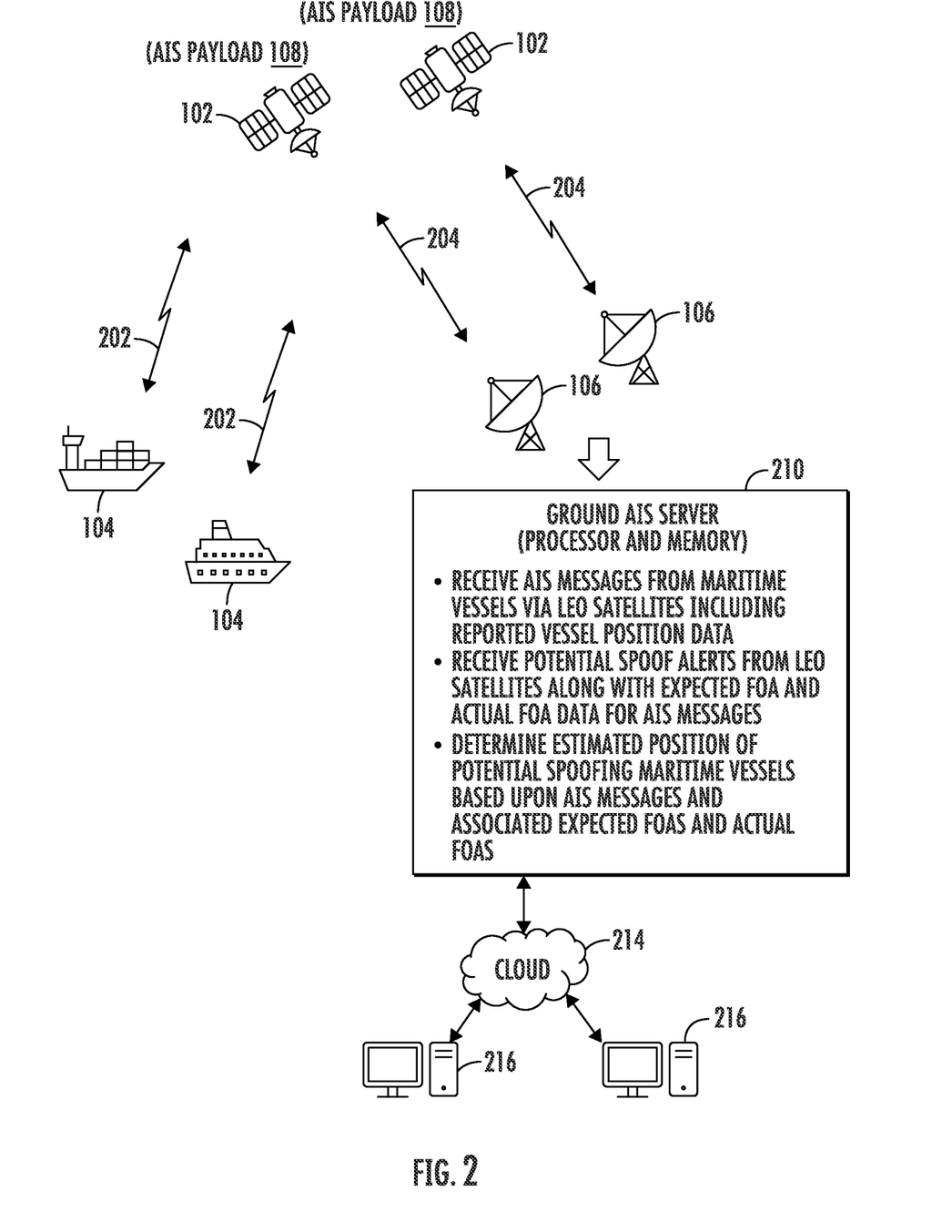
FIG. 2 is a schematic block diagram illustrating an exemplary embodiment of the satellite AIS system of FIG. 1 providing spoof detection based upon frequency of arrival (FOA) data.
Figure 3:
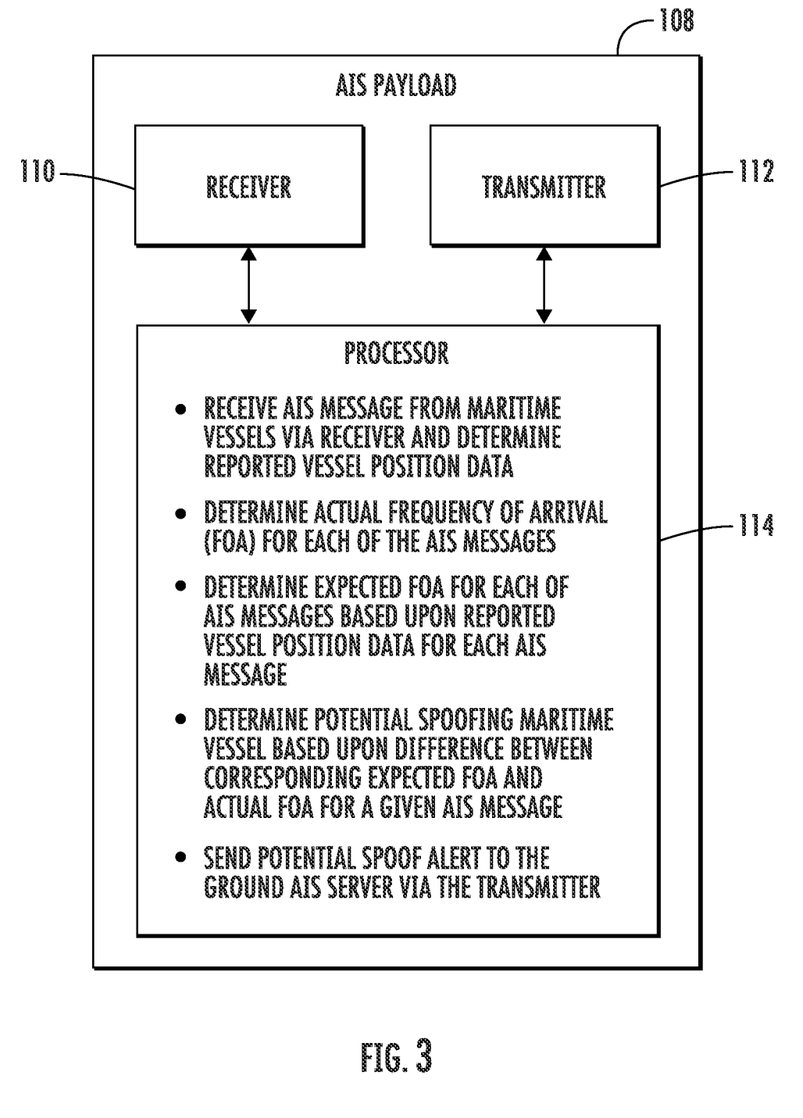
FIG. 3 is schematic block diagram of an example AIS payload which may be used with the system of FIG. 2.

Referring initially to FIGS. 1-3, a satellite-based Automatic Identification System (AIS) 100 for tracking a plurality of maritime vessels 104 is first described. In particular, the system 100 illustratively includes a constellation of Low-Earth Orbit (LEO) satellites 102. For example, the LEO satellite constellation may be the Iridium NEXT constellation. Each LEO satellite 102 includes an AIS payload 108 for receiving AIS messages from the maritime vessels 104 and for determining therefrom reported vessel position data and satellite-based observation data. Maritime vessel speeds and headings may also be used.

The system 100 also illustratively includes a ground AIS server 210 configured to obtain the reported maritime vessel position data and satellite-based observation data from the LEO satellites 102 over time. The ground AIS server 210 includes a processor and a memory associated therewith including non-transitory computer-executable instructions for performing the various operations discussed further below. In practice, there may be multiple ground AIS servers 210 which may be geographically distributed (e.g., in a cloud configuration), although a single ground AIS server is shown in FIG. 2 for clarity of illustration.

In operation, the maritime vessels 104 transmit AIS messages in which the vessel encodes its respective information as part of a 256-bit string of data, which includes sections or parts such as start and end flags, cyclic redundancy check (CRC) data, and a 168-bit data section for the vessel data. The vessel data typically includes the identity of the vessel, position data, heading, speed, and other pertinent information (i.e., AIS message content), and the AIS message is broadcast from the vessel and received by one or more LEO satellites 102 orbiting the earth.

The transmissions 202 are decoded by the LEO satellite(s) 102 that receives the transmissions 202. In turn, this decoded information and satellite-based observation data is sent by transmissions 204 to the ground antennas 106. The ground antennas 106 are in communication with the ground AIS server 210 (e.g., via a wide area network or Internet), which processes both the vessel data and satellite-based observation data to validate reported positions of the respective maritime vessels 104 to generate position validation (PV) data. The PV data may be accessed by user computers 216 via a cloud 214 or Internet, for example.

Each AIS payload 108 illustratively includes a receiver 110, transmitter 112, and processor 114 which are configured to receive AIS messages from the maritime vessels 104 and determine therefrom reported vessel position data from the AIS message content. Upon receiving AIS messages, the processor 114 determines an actual frequency of arrival (FOA) for each of the AIS messages, as well as an expected FOA for each of the AIS messages based upon the reported vessel position data for each AIS message. The frequency offset is affected by the closing rate of the satellite 102 to the vessel 104 on the earth. Moreover, the position (altitude and latitude/longitude) and speed/heading of each LEO satellite 102 is known with a relatively high degree of precision, allowing the AIS payload 108 to not only accurately measure the actual FOA, but also to estimate what the expected FOA should have been for a vessel 104 at the position reported in the AIS message. If a difference between a corresponding expected FOA and actual FOA for a given AIS message exceeds a threshold, the processor 114 determines the given vessel 104 to be a potential spoofing maritime vessel, and sends a potential spoof alert to the ground AIS server 210 accordingly. That is, a significant difference from reported position and measured character indicates faulty equipment or a "bad actor" (i.e., measurements do not support reported position).

Performing the potential spoof detection at the AIS payloads 108 provides a significant technical advantage. In particular, transmission bandwidth from the satellites 102 to ground may be relatively expensive, and sending extra data beyond the AIS messages themselves, such as signal arrival measurements, can be costly. Moreover, to transmit this extra data for all AIS messages would consume additional data storage and processing resources. Yet, in the present example, the AIS payloads 108 determine potential spoofing marine vessels 104 as AIS messages are received, and may accordingly send only the signal measurement data associated with messages from the spoofing marine vessels to thereby save transmission bandwidth, as well as storage and processing resources. Moreover, this approach allows for a potential spoof to be determined with as little as one measurement at the AIS payload 108, rather than having to process data over a series of occurrences to make such a determination. However, in some embodiments, more than one measurement may be used in the determination, as well as other factors.

For example, each AIS payload 108 may be further configured to determine an actual time of arrival (TOA) for each of the received AIS messages, and determine an expected TOA for each of the AIS messages based upon the reported vessel position data for the AIS message. Thus, the processor 114 may determine the potential spoofing maritime vessel further based upon a difference between a corresponding expected TOA and actual TOA for the given AIS message, as similarly described above with reference to the FOA difference. That is, the processor 114 may look to both the FOA and TOA differences, and determine a potential spoofing maritime vessel 104 when both of the differences exceed a respective frequency or time threshold. In some embodiments, a TOA difference may be used without the FOA difference to determine potential spoofing, as will be discussed further below.

As noted above, the AIS payload 108 sends AIS messages and the associated expected FOAs and actual FOAs to the ground AIS server 210 for the potential spoofing maritime vessel. The ground AIS server 210 is configured to determine an estimated position of the potential spoofing maritime vessel based upon the plurality of AIS messages and associated expected FOAs and actual FOAs. One example approach is illustrated in the plot 140 of FIG. 4. The ground AIS server 210 compares a sequence of AIS messages (per MMSI) reporting GPS position against the corresponding sequence of physical attributes (e.g., FOA) measured on the received signal by the AIS payload(s) 108, as shown. To determine the difference between reported and true position, a sequence of measurements may be used leveraging nonlinear least squares processing. In the illustrated example, points 141 correspond to actual Doppler profile measurements for received AIS messages, whereas points 142 correspond to the expected Doppler profile measurement based upon the reported position. Over a series of data points, a predicted Doppler profile may be determined corresponding to the actual path of the spoofing vessel 104.

Figure 4:
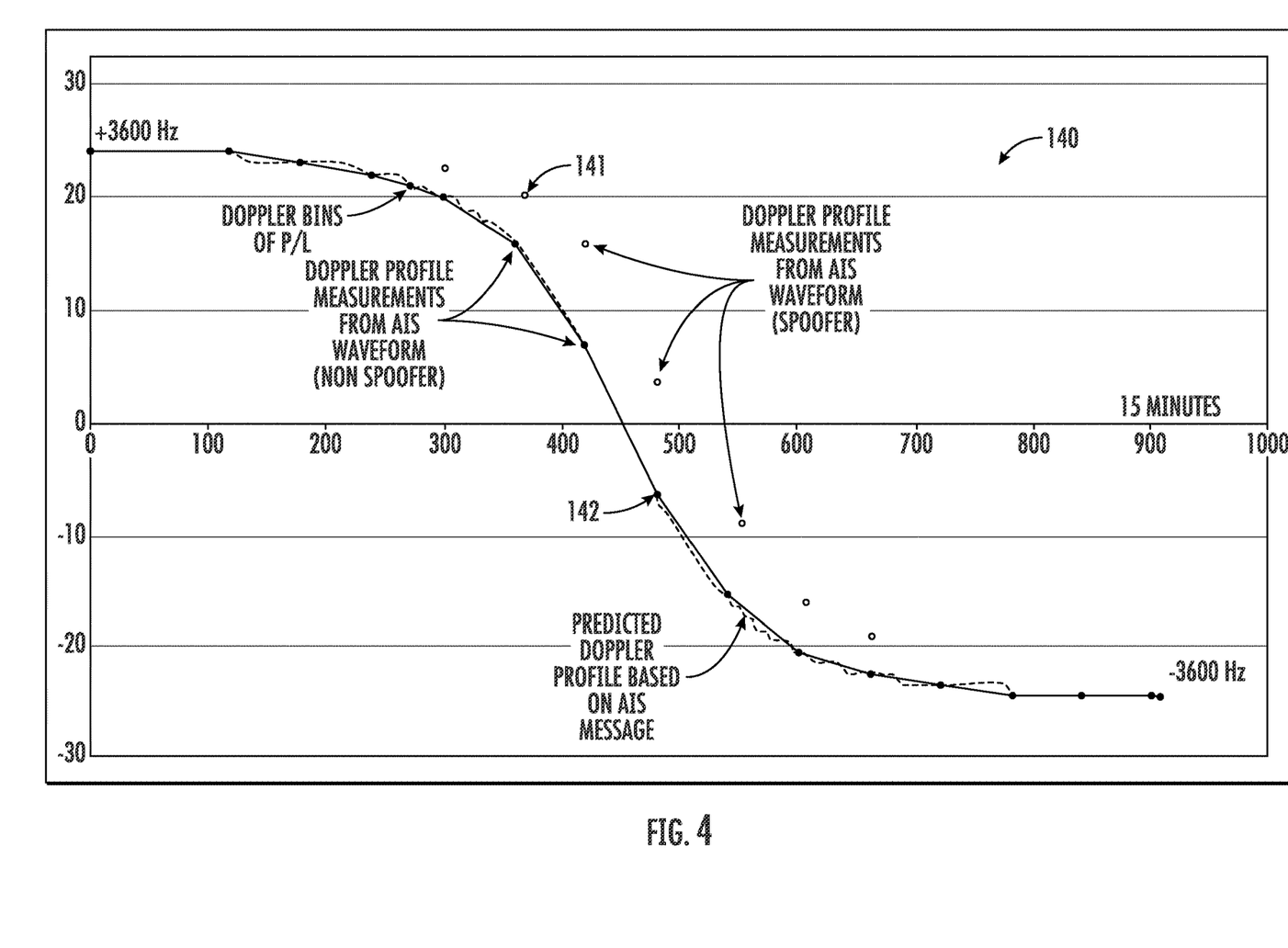
FIG. 4 is plot of predicted vs. actual Doppler profile data points in an example spoof detection scenario using the system of FIG. 2.

Generally speaking, precision improves with increased observations over a collection arc, although uncorrected receiver biases can impact accuracy regardless of data volume collected. The smaller the covariance the more precise the estimated position is, and thus smaller the spoofs that can be detected. For this approach, it may be assumed that the target emitter and receiver 110 biases are calibrated out or negligible to provide accurate geolocations, for example. The ground AIS server 210 may also leverage satellite ephemeris data (known data that represents the trajectory of the satellite over time) when determining the estimated position of the potential spoofing maritime vessel 104. Various third party ephemeris data may be used. The least squares approaches requires neither assumptions on errors nor complicated computations typical of other approaches.

In some embodiments, different threshold error boundaries may be used for determining what is a spoof. For example, different thresholds may be used for different MMSI's, such as based upon class of ship, etc. So, for example, cruise ships might have a relatively large (e.g., 20 km) boundary, whereas oil ships might have a much smaller threshold boundary (e.g., 1 km) to determine whether a spoof is occurring. Moreover, the AIS payload 108 may also continue to examine data for a potential spoofing vessel 104 until the vessel comes back within its respective threshold boundary, at which point it may discontinue sending the full data package including signal measurement data to the ground AIS server 210. This advantageously helps save signal bandwidth and processing resources, as discussed above.

Figure 5:
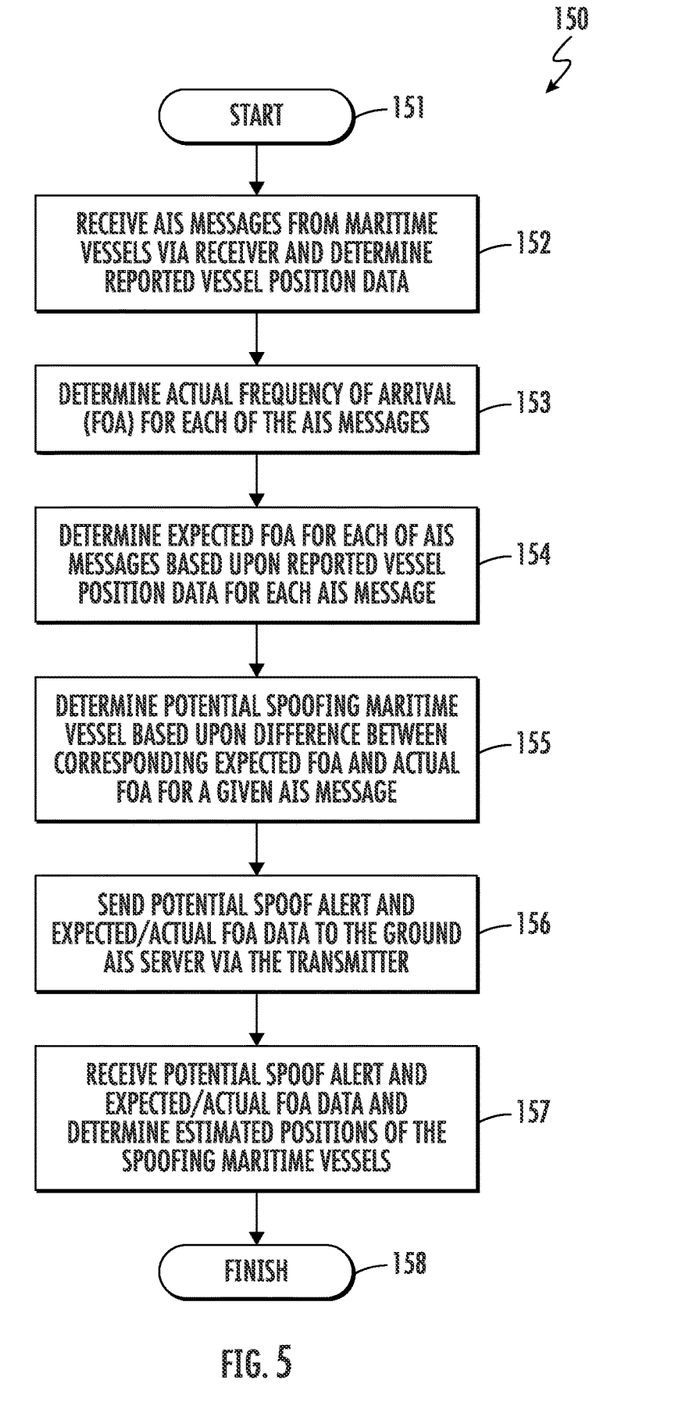
FIG. 5 is a flow diagram illustrating method aspects associated with the system of FIG. 2.

A related method for tracking maritime vessels 104 using the satellite AIS 100 is now described with reference to the flow diagram 150 of FIG. 5. Beginning at Block 151, the method illustratively includes, at each AIS payload, receiving AIS messages from the maritime vessels 104 and determining therefrom reported vessel position data (Block 152), determining an actual FOA for each of the AIS messages (Block 153), determining an expected FOA for each of the AIS messages based upon the reported vessel position data for each AIS message (Block 154), determining a potential spoofing maritime vessel based upon a difference between a corresponding expected FOA and actual FOA for a given AIS message, and sending a potential spoof alert to the ground AIS server 210 (Blocks 155-156). The method further illustratively includes receiving the potential spoof alert at the ground AIS server 210, and in some embodiments the expected/actual FOA data, and determining estimated positions of the spoofing maritime vessels 104, at Block 157, as discussed further above. The method of FIG. 5 illustratively concludes at Block 158.

Figure 6:
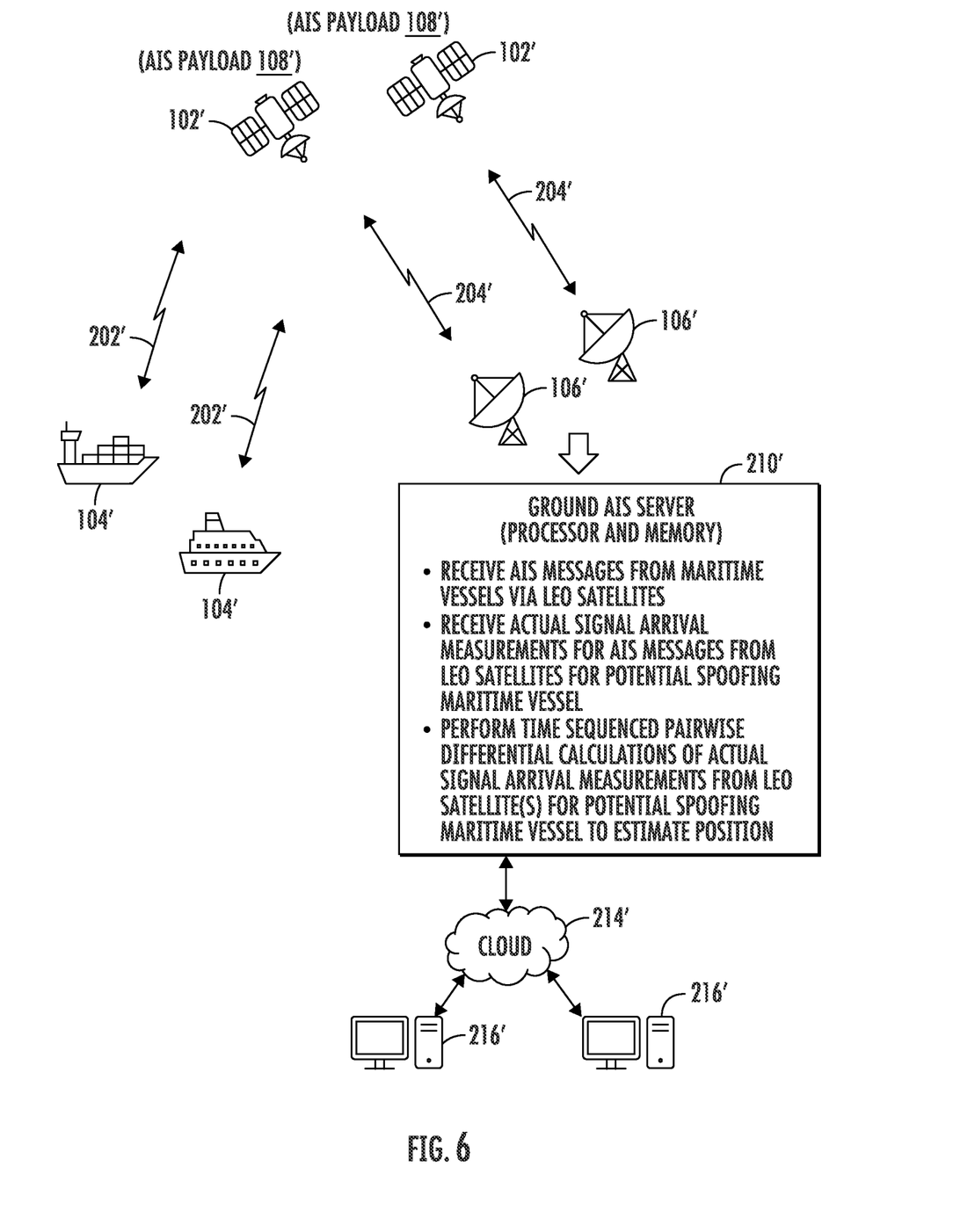
FIG. 6 is a schematic block diagram illustrating another exemplary embodiment of the satellite AIS system of FIG. 1 providing spoof detection based upon time sequenced pairwise differential calculations.

Turning now to FIG. 6, another example AIS system 100' is described in which the ground AIS server 210' may be configured to perform time sequenced pairwise differential calculations of actual signal arrival measurements (e.g., differential FOA (DFOA) and/or TOA (DFOA)) from one or more AIS payloads for a potential spoofing maritime vessel to estimate a position of the potential spoofing maritime vessel. This advantageously allows for mitigation of emitter/receiver bias to thereby provide more accurate position estimates of spoofing maritime vessels.

By way of background, emitter/signal bias can be a significant issue when attempting to measure time or frequency of arrival of AIS signals. Aid to navigation (A2N) sites support AIS signals and can be used as a source for receiver calibration. However, A2Ns are generally not well controlled for either frequency emitted or time of transmission. Moreover, A2Ns will only provide calibration for AIS receivers, but this does nothing for biases of vessel 104' emitters. This is problematic in that the standard on AIS transmitters allows for up to a 450 Hz error, which would result in a significant "Doppler" offset (and, thus, error in estimated position). Moreover, orbital average power (OAP) limitations for a payload may require power-cycling of an AIS payload, and hence there may be payload drift due to power cycles and operational conditions. Further, drift impacting the accuracy of payload measurements between calibration cycles may still cause errors even for "always on" payloads. Thus the pairwise differential approach advantages are appreciated by those skilled in the art.

The ground AIS server 210' may use time of arrival and/or frequency of arrival estimates from a given AIS payload without having to calibrate for AIS emitter or receiver bias. More particularly, the use of time sequenced pairwise measurements from a single AIS receiver platform removes target emitter and AIS receiver biases, and provides a basis for more accurate geolocation.

In the relationships below the subscripts x, y, and z generically relate to the typical Cartesian position coordinates. The subscript 1 generically indicates a "label" for the position of a vessel. The subscript "s" generically indicates the position of the satellite AIS observer. There are a total of N measurements available, and the integer time index represented the time ordering of the observables. In general boldface quantities indicate a vector, and this allows more compact notation by suppressing individual x,y,z components for example.

With respect to differential time of arrival(DTOA), given a signal transmitted at some known time and the measurement includes a bias $\tau_b$, the signal time of arrival at the observation n is:

$$\tau[n] = \frac{1}{c}\sqrt{(p_{1x}[n] - p_{sx})^2 + (p_{1y}[n] - p_{sy})^2 + (p_{1z}[n] - p_{sz})^2} + \tau_b + \frac{1}{c}|p_1[n] - p_s| + \tau_b, n = 1 \ldots N$$

Assuming the time bias $\tau_b$ of the system (Tx+Rx) is constant over a collection interval, the computed time differences between measurements to cancel this bias is given by:
DTOA:

$$\Delta\tau[n] = \tau[n+1] - \tau[n] = \frac{1}{c}|p_{1s}[n+1] - p_s| - \frac{1}{c}|p_{1s}[n] - p_s|,$$
$$n = 1 \ldots N-1$$

With respect to differential frequency of arrival (DFOA), a signal is transmitted from a source at a nominal frequency of $v_0$ plus some unknown offset $v_s$ (here the subscript "s" indicates the terrestrial AIS source) and then received and down-converted by a receiver having an unknown frequency offset of $v_1$. On observation n, the received, down-converted signal will have a frequency of:

$$v_{1s}[n] = (v_0 + v_s)\frac{1 - \frac{u_{1s}[n]}{c}}{\sqrt{1 - \left(\frac{u_{1s}[n]}{c}\right)^2}} - (v_0 + v_1), n = 1 \ldots N$$

where the relative velocity $u_{1s}[n]$ between a stationary source s and a moving receiver can be computed as $$u_{1s}[n] = v_1[n] \cdot \frac{p_1[n] - p_s}{|p_1[n] - p_s|} =$$
$$v_1[n] \cdot \frac{p_1[n] - p_s}{\sqrt{(p_{1x}[n] - p_{sx})^2 + (p_{1y}[n] - p_{sy})^2 + (p_{1z}[n] - p_{sz})^2}}, n = 1 \ldots N$$

and positive values indicate that the platform is receding from the source. Assuming that $u_{1s} \ll c$, we can then approximate the frequency of arrival as $$v'_{1s}[n] = -v_0\frac{u_{1s}[n]}{c} + v_b, n = 1 \ldots N$$

Here, the source and receiver frequency offsets have been combined into a single constant bias term $v_b$. Assuming this bias term remains constant over the collection interval, the normalized frequency differences of arrival between measurements may be calculated as
DFOA:

$$\Delta v[n] = \frac{v'_{1s}[n+1] - v'_{1s}[n]}{v_0} =$$
$$-\frac{1}{c}v_1[n+1] \cdot \frac{p_1[n+1] - p_s}{|p_1[n+1] - p_s|} + \frac{1}{c}v_1[n] \cdot \frac{p_1[n] - p_s}{|p_1[n] - p_s|}, n = 1 \ldots N-1$$

Using the above DTOA and DFOA results provides the observable model function as $$f(\theta, z) = \begin{bmatrix} \Delta\tau \\ \Delta v \end{bmatrix}$$

where $\Theta$ is a vector of the parameters to estimate (the source geolocation), and z is a vector of known system parameters (e.g., platform ephemerides). Expanding this to a full vector of measurements gives $$f(\theta, z) = \begin{bmatrix} \Delta\tau[1] \\ \vdots \\ \Delta\tau[N-1] \\ \Delta v[1] \\ \vdots \\ \Delta v[N-1] \end{bmatrix}$$

and a vector of parameters to estimate and system parameters:

$$\theta = \begin{bmatrix} p_{sx} \\ p_{sy} \end{bmatrix} \text{ and } z = \begin{bmatrix} p_1[1] \\ p_1[N] \\ \vdots \\ v_1[1] \\ v_1[N] \end{bmatrix}$$

Where H is the 2(N−1)×2 Jacobian matrix:

$$H = \frac{\partial f(\theta, z)}{\partial \theta} = \begin{bmatrix} \frac{\partial \Delta\tau[1]}{\partial p_{sx}} & \frac{\partial \Delta\tau[1]}{\partial p_{sy}} \\ \vdots & \vdots \\ \frac{\partial \Delta\tau[N-1]}{\partial p_{sx}} & \frac{\partial \Delta\tau[N-1]}{\partial p_{sx}} \\ \frac{\partial \Delta v[1]}{\partial p_{sx}} & \frac{\partial \Delta v[1]}{\partial p_{sy}} \\ \vdots & \vdots \\ \frac{\partial \Delta v[N-1]}{\partial p_{sx}} & \frac{\partial \Delta v[N-1]}{\partial p_{sx}} \end{bmatrix}$$

Finding an estimate of $\Theta$ by minimizing square error for a nonlinear problem can be stated mathematically as $$e = f(\hat{\theta}, z) - f(\theta, z)$$

$$\min_{\hat{\theta}} J = e^T e$$

Often this problem is solved iteratively. To initialize the iterative solution, an initial guess for the emitter location is made using any information available, and a ENU coordinate system for this iteration is centered at this point. Next, the nonlinear measurement model is linearized (attaching ENU system at current iterate) as follows:

$$f(\theta,z) = f(\hat{\theta}_n, z) + H(\theta - \hat{\theta}_n)$$

The iteration is defined to determine the "next guess":

$$(H^T H)^{-1} H^T [f(\theta,z) - f(\hat{\theta}_n, z)] + \hat{\theta}_n = \hat{\theta}_{n+1}$$

The current ENU solution is then projected to a spheroid (e.g., WGS-84 is a standard model maintained by the US government), and the ECEF (Earth Centered Earth Fixed) coordinates obtained. Finally, a determination is made as to whether suitable convergence is obtained (i.e., sequential differences in iterates), otherwise for the next iterate a new ENU system is defined at the current ECEF estimate, and the process repeats. As will be appreciated by those skilled in the art, the ECEF coordinate system is globally defined with one origin at the center of the spheriod, and an ENU system is "locally" defined The foregoing will be further understood with reference to an example use case. As a satellite 102' flies over a target vessel 104', it will receive a sequence of AIS measurements during the time window that the vessel is "visible" to the satellite (i.e., the satellite goes beyond the horizon of the vessel). For this example, it will be assumed that the satellite 102' receives six AIS messages from the target vessel 104' during the time window. In the case of TOA, subtracting the first TOA from the second TOA, etc., will result in five DTOAs. Assuming that the emitter bias is the same across all of the different transmissions, the emitted bias will accordingly be cancelled out across these differences. From a given satellite 102' platform, you get a sequence of differential measurements, and since the bias from the emitter is relatively constant you can use one to cancel out the other. Significantly, this bias cancellation can be performed from a single platform, whereas other error correct approaches may require a plurality of different platforms and/or A2N calibration, but the present approach does not. Another advantage of this approach is that, even if emitter bias is drifting, it can still cancel out because you are taking the differential from one measurement to the next. Another significant advantage is that this approach allows for processing without having to compensate for complicated temperature offsets.

The above-described approach automatically removes long-term biases and short-term drift from both non-cooperative emitters (AIS sources) and the satellite-based receiver. Moreover, this approach handles receivers even during warm-up/power-cycles, in that drift only needs to be slowly varying between consecutive AIS message times for it to work. Moreover, this also provides a useful approach for "always on" payloads as well as there is always some level of thermal-induced drift. Furthermore, this approach works despite non-cooperative target emitters (i.e., known or controlled emitters are not required). The ground AIS server 210' may accordingly provide accurate spoofer geolocation, i.e., a location of a spoofer maritime vessel 104' can be precisely developed with a relatively small number of single-platform differential measurements using nonlinear least squares. This provides additional benefits in that a least squares approach does not require any error assumptions (e.g., density functions characterizing an error such as normality). Moreover, it provides improved location precision and reduces error ellipse, enabling increasing discrimination versus spoof location.

Figure 7:
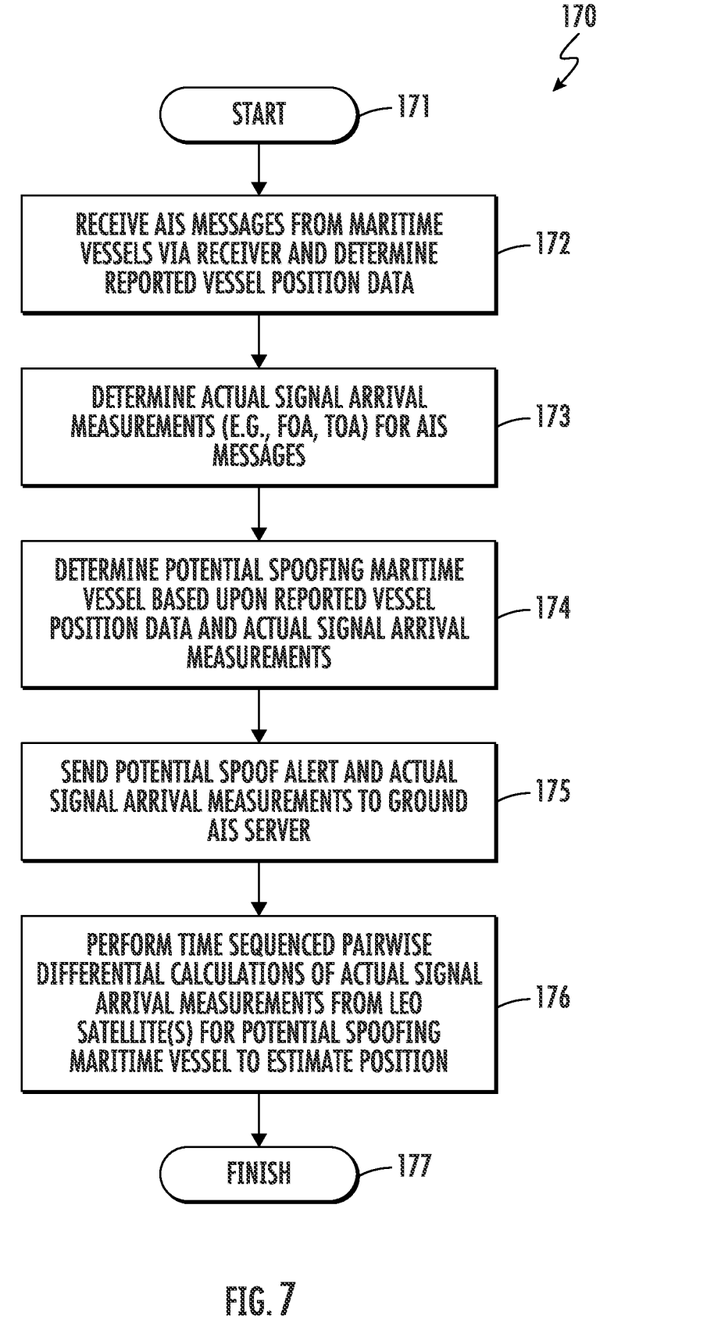
FIG. 7 is a flow diagram illustrating method aspects associated with the system of FIG. 6.

Referring additionally to the flow diagram 170 of FIG. 7, beginning at Block 171 a related method may include, at each AIS payload 108', receiving AIS messages from the maritime vessels 104' and determining therefrom reported vessel position data (Block 172), determining actual signal arrival measurements for the AIS messages (Block 173), determining a potential spoofing maritime vessel based upon the reported vessel position data and actual signal arrival measurements (Block 174), and sending a potential spoof alert to the ground AIS server 210' accordingly (Block 175). The method further illustratively includes, at the ground AIS server 210', performing time sequenced pairwise differential calculations of the actual signal arrival measurements from a given AIS payload and for the potential spoofing maritime vessel 104' at the ground AIS server for estimating a position of the potential spoofing maritime vessel, at Block 176. The method of FIG. 7 illustratively concludes at Block 177.

Figure 8:
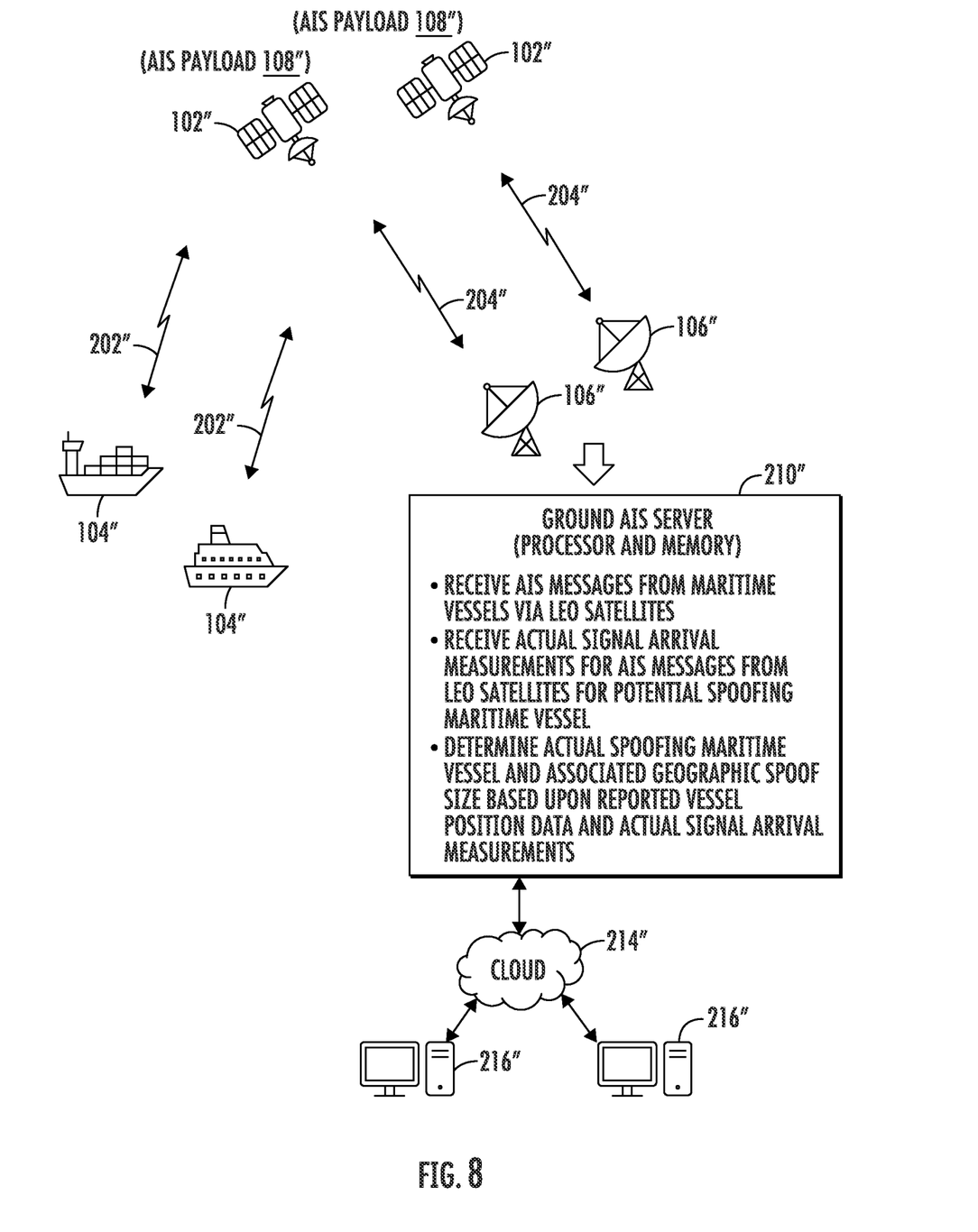
FIG. 8 is a schematic block diagram illustrating another exemplary embodiment of the satellite AIS system of FIG. 1 providing spoofing marine vessel detection and associated geographic spoof sizes.
Figure 9:
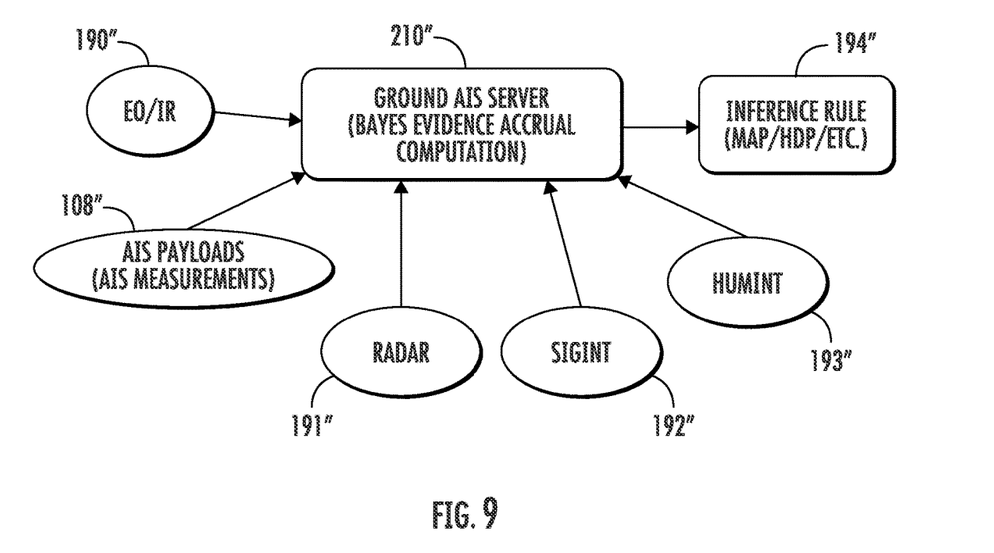
FIG. 9 is a schematic block diagram illustrating an example data processing algorithm for performing spoofing marine vessel detection within the system of FIG. 8.
Figure 10:
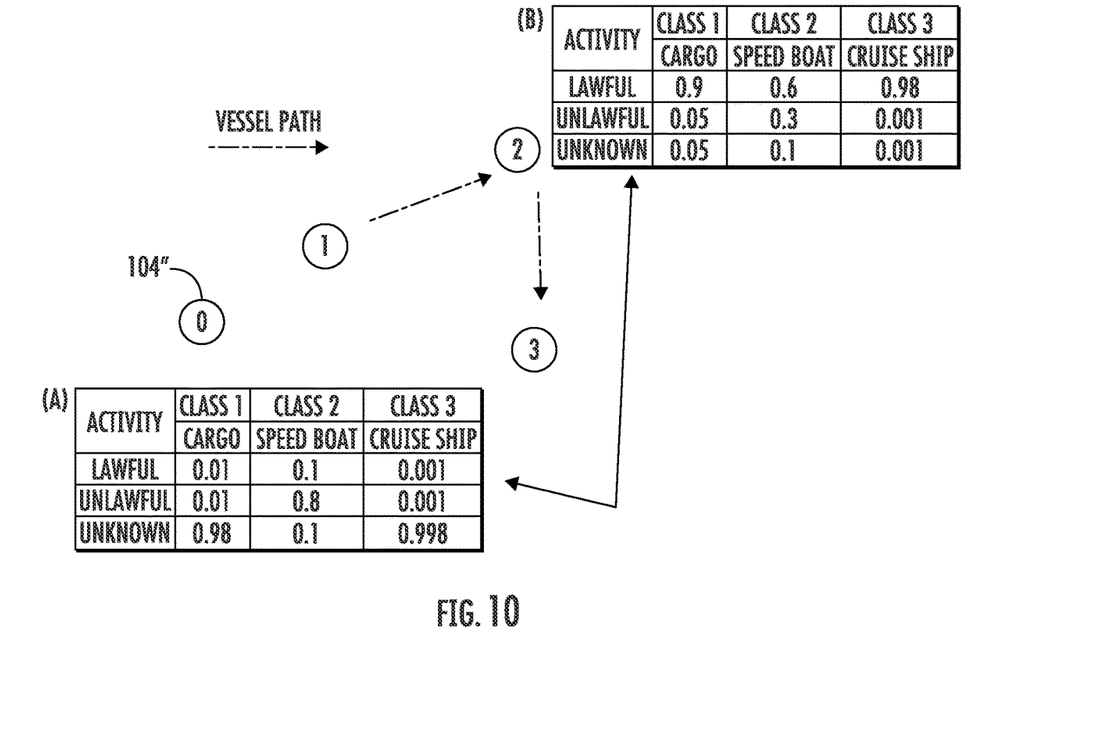
FIG. 10 is a schematic block diagram illustrating an example spoofing marine vessel detection scenario which may be implemented within the system of FIG. 8 using different vessel categories and geographic spoofing thresholds.

Turning now to FIGS. 8-10, in accordance with another example implementation of the AIS system 100", the ground AIS server 210" may advantageously determine actual spoofing maritime vessels along with associated geographic spoof sizes based upon reported vessel position data from the AIS messages and actual signal arrival measurements (e.g., FOA and/or TOA) for the potential spoofing maritime vessel 104". The geographic spoof sizes may be factored into a "credibility" score that is developed using various AIS-based information. This may be important for a number of applications, including early warning of approaching vessels with possible "bad intent" within a port or political boundary.

Various factors in addition to spoof size can be accumulated over time for use in a vessel credibility score, such as: position spoof history and size of spoofs; ports visited and time-of-day and duration of visit; vessel going "dark" and re-appearance; class of vessel; inconsistent AIS messages with respect to expected movements (e.g., location, class, etc.); travel in lanes for shipping; and duplicate MMSI or invalid MMSI. In an example implementation, Bayesian evidence accrual may be used to generate the credibility scores. More particularly, Bayesian evidence accrual is an approach which allows for collecting a sequence of observations about the MMSI in question, as follows:

$$p(\theta|X_t;\beta) = K p(\theta|x_t, s_{t-1};\beta) = p(x_t|\theta;\beta) p(\theta|X_{t-1};\beta)$$

Where $p(\theta|X_t; \beta)$ is the posterior distribution for all observed data through observation t; K is a superfluous constant; $p(x_t|\theta; \beta)$ is the likelihood of the observation $x_t$ conditioned on $\theta$ and $\beta$ at t; $p(\theta|x_{t-1}|\beta)$ is a prior distribution over discrete decision choices for observation t; and $\beta$ is a paramterization of known data, such as vessel type, flag, weather, hazards, etc. Each AIS measurement may update the posterior evidence, which scores the entity's "credibility" (e.g., "Bad", "Truthful", or "Unknown"). A declaration of the "credibility" can be made using the posterior (e.g., maximum a-posterior rule). The geolocation is produced from received Doppler and time of message receipt (TOMR), regardless if the MMSI is "truthful", i.e., is a potential spoofer. This approach advantageously allows for "intelligent data pruning", in that it avoids growing memory issues with the storage of long histories, as will be discussed further below.

An example data collection scheme for Bayesian evidence accrual is shown in FIG. 9. In addition to AIS measurements from the AIS payloads 108", other data sources may include electro-optic (EO) and infrared (IR) sources 190", radar sources 191", signal intelligence (SIGINT) sources 192", and human intelligence (HUMINT) sources 193". The ground AIS server 210" may perform Bayesian evidence accrual from all of these sources and utilize an inference rule 194" (e.g., MAP, HPD, etc.) to generate the respective credibility scores therefrom, for example.

The accumulation of evidence over time to revise credibility scores is demonstrated in the example of FIG. 10. Here, at a time 0 there is relatively little data known about a vessel 104" traveling along a path, which is represented in table (a). As subsequent data is acquired for the vessel 104" as it travels on the path to points 1, 2, and 3, the credibility score changes. As noted above, different classes of vessels 104" may have different credibility thresholds associated with them. Here, cruise ships are generally considered to be among the most reliable or truthful, followed by cargo ships and then speed boats. Note that by the time a cruise ship completes the illustrated path, there is an extremely high confidence factor that it is engaged in lawful activity (98%), whereas for a speed boat traveling the same course the probability of lawful activity is lower (60%) because of the class of vessel, as well as other factors such as those discussed above (e.g., inconsistent messages, going dark, etc.).

The above-described approach advantageously allows immediate visualization of potentially "bad actors" and their true current location. In some embodiments, a "trace back" may also be placed on an entity on a graphical user interface (GUI) to visualize its history. The exploitation of various metrics (e.g., path deviation, port visits, etc.) using derived geolocation, as opposed to reported position, and doing so world-wide provides for a more thorough and accurate determination of vessel 104" credibility through the inclusion of multi-INT data, not just AIS data, to supplement the decision-making process. The credibility score may be updated by various factors that influence if a vessel might be nefarious—including where it has been, "lied about position", "went dark", etc.

Moreover, the Bayesian evidence accrual approach supports adaptive learning where observations can be reprocessed at any time through updated likelihood functions. For example, likelihoods may be altered with new information, e.g., drug trafficking now being well-known for a port for vessels of a certain size or HUMINT or other data sources. The present approach also allows prior data to be decision biased or non-judgmental at the outset. The declaration/decision at each observation regarding credibility can be binary (Liar/Truthful) or multi-level (e.g. 0-10), for example. Further, growing memory issues may be avoided when using intelligent data pruning, keeping only the N most significant likelihood contributors, and N need not be fixed across all vessels. It should also be noted that this approach may be used in conjunction with those discussed above, i.e., enhanced spoofing detection at the AIS payloads and time sequenced pairwise differential calculations to provide still further memory and processing savings.

Figure 11:
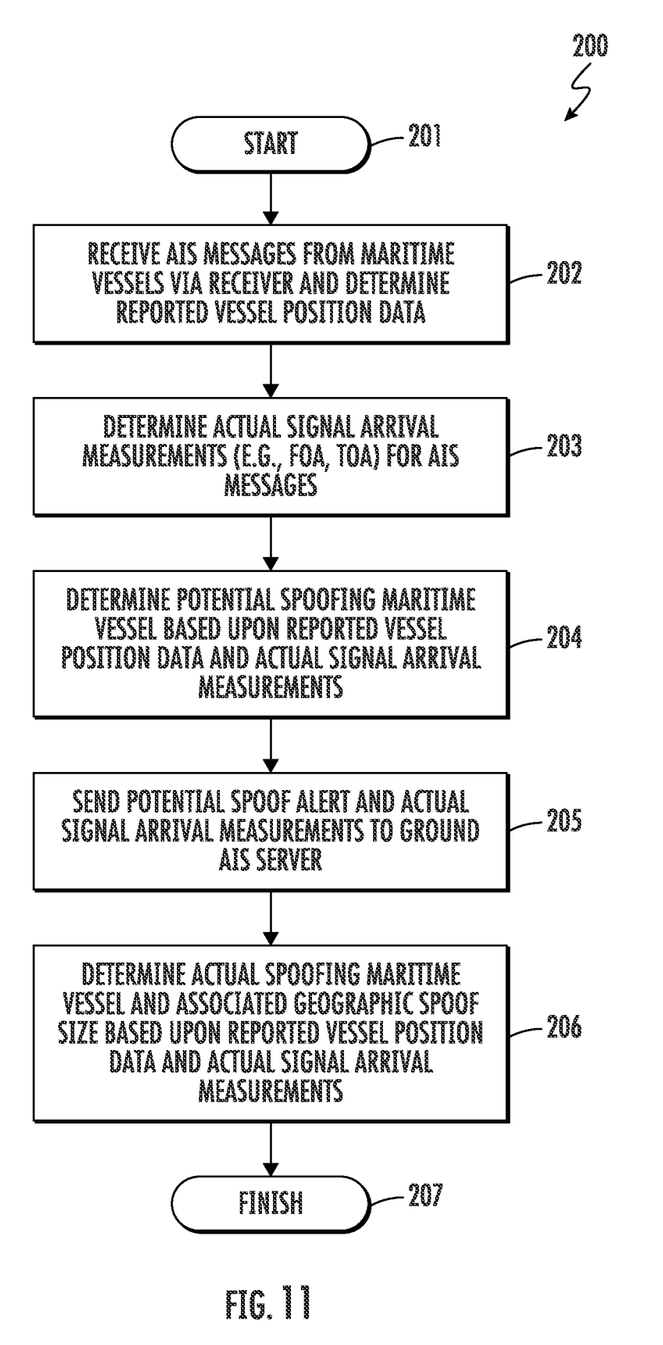
FIG. 11 is a flow diagram illustrating method aspects associated with the system of FIG. 8.

A related method for tracking maritime vessels 104" is now described with reference to the flow diagram 200 of FIG. 11. The method begins (Block 201) with, at each AIS payload, receiving AIS messages from the maritime vessels 104" and determining therefrom reported vessel position data (Block 202), determining actual signal arrival measurements for the AIS messages (Block 203), determining a potential spoofing maritime vessel based upon the reported vessel position data and actual signal arrival measurements (Block 204), and sending the potential spoof alerts to the ground AIS server 210" (Block 205), as discussed further above. The method further illustratively includes determining, at the ground AIS server 210", an actual spoofing maritime vessel 104" and associated geographic spoof size based upon the reported vessel position data and actual signal arrival measurements for the potential spoofing maritime vessel, at Block 206. The method of FIG. 11 illustratively concludes at Block 207.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. An Automatic Identification System (AIS) for tracking a plurality of maritime vessels, the AIS comprising:
   a ground AIS server; and
   a constellation of Low-Earth Orbit (LEO) satellites in communication with the ground AIS server, each LEO satellite having respective LEO satellite ephemeris data associated therewith, each LEO satellite comprising an AIS payload configured to
      receive AIS messages from the plurality of maritime vessels and determine therefrom reported vessel position data,
      collect signal frequency measurement data associated with the AIS messages,
      determine an actual frequency of arrival (FOA) for each of the AIS messages based upon the collected signal frequency measurement data,
      determine an expected FOA for each of the AIS messages based upon the reported vessel position data for each AIS message and the respective LEO satellite ephemeris data, and
      determine a potential spoofing maritime vessel based upon a difference between a corresponding expected FOA and actual FOA for a given AIS message and send a potential spoof alert to the ground AIS server.

2. The AIS of claim 1 wherein each AIS payload is further configured to:
   collect signal timing measurement data associated with the AIS messages;
   determine an actual time of arrival (TOA) for each of the AIS messages based upon the collected signal timing measurement data;
   determine an expected TOA for each of the AIS messages based upon the reported vessel position data for the AIS message and the respective LEO satellite ephemeris data; and
   determine the potential spoofing maritime vessel further based upon a difference between a corresponding expected TOA and actual TOA for the given AIS message.

3. The AIS of claim 1 wherein each AIS payload is further configured to send a plurality of AIS messages and associated expected FOAs and actual FOAs to the ground AIS server for the potential spoofing maritime vessel.

4. The AIS of claim 3 wherein the ground AIS server is configured to determine an estimated position of the potential spoofing maritime vessel based upon the plurality of AIS messages and associated expected FOAs and actual FOAs.

5. The AIS of claim 4 wherein the ground AIS server is configured to determine the estimated position of the potential spoofing maritime vessel based upon a nonlinear least squares algorithm.

6. The AIS of claim 4 wherein the ground AIS server is configured to determine the estimated position of the potential spoofing maritime vessel further based upon the respective LEO satellite ephemeris data.

7. The AIS of claim 1 wherein the maritime vessels have different vessel categories associated therewith; and wherein each AIS payload determines the potential spoofing maritime vessel based upon the different vessel categories.

8. An Automatic Identification System (AIS) payload for a Low-Earth Orbit (LEO) satellite in communication with a ground AIS server in a satellite Automatic Identification System (AIS) for tracking a plurality of maritime vessels, the LEO satellite having LEO satellite ephemeris data associated therewith, the AIS payload comprising:
a receiver;
a transmitter; and
a processor configured to cooperate with the receiver and transmitter to
receive AIS messages from the plurality of maritime vessels via the receiver and determine therefrom reported vessel position data,
collect signal frequency measurement data associated with the AIS messages,
determine an actual frequency of arrival (FOA) for each of the AIS messages based upon the collected signal frequency measurement data,
determine an expected FOA for each of the AIS messages based upon the reported vessel position data for each AIS message and the LEO satellite ephemeris data, and
determine a potential spoofing maritime vessel based upon a difference between a corresponding expected FOA and actual FOA for a given AIS message and send a potential spoof alert to the ground AIS server via the transmitter.

9. The AIS payload of claim 8 wherein the processor is further configured to:
collect signal timing measurement data associated with the AIS messages;
determine an actual time of arrival (TOA) for each of the received AIS messages based upon the collected signal timing measurement data;
determine an expected TOA for each of the AIS messages based upon the reported vessel position data for the AIS message and the LEO satellite ephemeris data; and
determine the potential spoofing maritime vessel further based upon a difference between a corresponding expected TOA and actual TOA for the given AIS message.

10. The AIS payload of claim 8 wherein the processor is further configured to send a plurality of AIS messages and associated expected FOAs and actual FOAs to the ground AIS server via the transmitter for the potential spoofing maritime vessel.

11. The AIS payload of claim 8 wherein the maritime vessels have different vessel categories associated therewith; and wherein the processor determines the potential spoofing maritime vessel based upon the different vessel categories.

12. A method for tracking a plurality of maritime vessels using a satellite Automatic Identification System (AIS) comprising a ground AIS server and a constellation of Low-Earth Orbit (LEO) satellites in communication with the ground AIS server, with each LEO satellite having respective LEO satellite ephemeris data associated therewith and comprising an AIS payload, the method comprising:
at each AIS payload,
receiving AIS messages from the plurality of maritime vessels and determining therefrom reported vessel position data,
collecting signal frequency measurement data associated with the AIS messages,
determining an actual frequency of arrival (FOA) for each of the AIS messages based upon the collected signal frequency measurement data,
determining an expected FOA for each of the AIS messages based upon the reported vessel position data for each AIS message and the respective LEO satellite ephemeris data, and
determining a potential spoofing maritime vessel based upon a difference between a corresponding expected FOA and actual FOA for a given AIS message and sending a potential spoof alert to the ground AIS server; and
receiving the potential spoof alert at the ground AIS server.

13. The method of claim 12 further comprising, at each AIS payload:
collecting signal timing measurement data associated with the AIS messages;
determining an actual time of arrival (TOA) for each of the AIS messages based upon the collected signal timing measurement data;
determining an expected TOA for each of the AIS messages based upon the reported vessel position data for the AIS message and the respective LEO satellite ephemeris data; and
determining the potential spoofing maritime vessel further based upon a difference between a corresponding expected TOA and actual TOA for the given AIS message.

14. The method of claim 12 further comprising, at each AIS payload, sending a plurality of AIS messages and associated expected FOAs and actual FOAs to the ground AIS server for the potential spoofing maritime vessel.

15. The method of claim 12 further comprising, at the ground AIS server, determining an estimated position of the potential spoofing maritime vessel based upon the plurality of AIS messages and associated expected FOAs and actual FOAs.

16. The method of claim 15 wherein determining the estimated position of the potential spoofing maritime vessel comprises determining the estimated position of the potential spoofing maritime vessel based upon a nonlinear least squares algorithm.

17. The method of claim 16 wherein determining the estimated position of the potential spoofing maritime vessel comprises determining the estimated position of the potential spoofing maritime vessel further based upon the respective LEO satellite ephemeris data.

18. The method of claim 12 wherein the maritime vessels have different vessel categories associated therewith; and wherein determining the potential spoofing maritime vessel comprises determining the potential spoofing maritime vessel based upon the different vessel categories.

\* \* \* \* \*